United States Patent [19]
McKenna

[11] Patent Number: 5,119,624
[45] Date of Patent: Jun. 9, 1992

[54] GAS TURBINE ENGINE POWER UNIT

[75] Inventor: Peter G. McKenna, Warwick, England

[73] Assignee: Rolls-Royce Business Ventures Limited, Derby, England

[21] Appl. No.: 519,575

[22] Filed: May 7, 1990

[30] Foreign Application Priority Data

Jun. 15, 1989 [GB] United Kingdom ............. 8913813

[51] Int. Cl.⁵ ............................................. F02C 07/10
[52] U.S. Cl. ...................................... 60/39.511; 60/268; 60/39.15
[58] Field of Search .............. 60/39.511, 39.161, 39.36, 60/39.163, 39.33, 39.15, 224, 225, 266, 269, 268

[56] References Cited

U.S. PATENT DOCUMENTS

| | | | |
|---|---|---|---|
| 2,619,796 | 12/1952 | Sterland | 60/39.15 |
| 2,665,548 | 1/1954 | Traupel | 60/39.15 |
| 2,675,673 | 4/1954 | Mallinson et al. | 60/39.15 |
| 3,524,318 | 8/1970 | Bauger et al. | 60/268 |
| 3,585,795 | 6/1971 | Grieb | 60/39.15 |
| 3,765,170 | 10/1973 | Nakamura | 60/39.511 |
| 4,070,825 | 1/1978 | Kronogard | 60/39.511 |
| 4,463,553 | 8/1984 | Boudigues | 60/268 |

FOREIGN PATENT DOCUMENTS

| | | | |
|---|---|---|---|
| 253088 | 12/1948 | Switzerland | 60/39.15 |
| 651319 | 3/1951 | United Kingdom . | |
| 2199083 | 6/1988 | United Kingdom . | |

Primary Examiner—Richard A. Bertsch
Assistant Examiner—Michael I. Kocharov
Attorney, Agent, or Firm—Oliff & Berridge

[57] ABSTRACT

A gas turbine engine power unit (10) comprising a gas turbine engine hot gas generator (10a), the exhaust efflux of which drives a turbine (20) having a power output shaft (22). The exhaust efflux from the turbine (20) is directed into a chamber (23) having two outlets (24,25) to atmosphere. The outlets (24,25) are provided with valves (26,28) which are operable to ensure that only one outlet (24,25) is open at a given time. The first outlet (24) contains a heat exchanger (15) whereas the second outlet (25) contains a further turbine (30). The further turbine (30) drives an air compressor (32) the output of which is directed to an air inlet (36) of the gas turbine engine (10a) in order to facilitate a boost in its output power.

13 Claims, 2 Drawing Sheets 5,119,624

GAS TURBINE ENGINE POWER UNIT

BACKGROUND OF THE INVENTION

This invention relates to a gas carbon engine power unit and in particular to a gas turbine engine power unit which is arranged to operate in first mode of operation in which its power output is of a given magnitude and in a second mode of operation in which its power output is boosted to a higher magnitude.

It is known from, for instance GB651319 and GB2199083A, to provide gas turbine engine power units which are arranged to operate in a first, conventional mode of operation and in a second mode of operation in which their output power is boosted when compared to that of their first mode of operation. Such power units comprise a conventional gas turbine engine gas generator and a power turbine driven by that generator. In the conventional mode of operation, the gas efflux from the power turbine is directed to a heat exchanger which places the hot gas efflux in heat exchange relationship with compressed air within the gas turbine engine gas generator prior to that air being directed into the engine's combustion equipment. The gas efflux originating from the power turbine is directed through non-operative combustion equipment to a further turbine which drives a supplementary air compressor which in turn supplies pressurised air to the gas turbine engine gas generator.

In the boosted mode of operation, the heat exchanger is by-passed and the power turbine gas efflux is directed to the now operative combustion equipment. The resultant combustion products then expand through the further turbine which drives the supplementary air compressor at an increased rate, thereby boosting the amount of air supplied to the gas turbine engine gas generator and in turn the power output of the power turbine driven by the gas generator.

The power units of GB651319 and GB2199083A are depicted in diagrammatic form and do not address the problems of constructing an actual power unit in which the efficiency of the unit is maintained at acceptable levels by minimising aerodynamic and thermodynamic losses. Moreover they do not address problems associated with the provisions of constructing a power unit which is sufficiently compact to be located in a vehicle, such as a marine vessel or land vehicle, in which the space available for a power unit is limited.

SUMMARY OF THE INVENTION

It is an object of the present invention to provide a gas turbine engine power unit having a boosted power output in which such problems are substantially minimised.

According to the present invention, a gas turbine engine power unit comprises a gas turbine engine hot gas generator which includes combustion equipment and an air compressor having two air inlets, a first power turbine driven in operation by the exhaust efflux of said gas turbine engine hot gas generator, a chamber into which the exhaust efflux from said first power turbine is directed, said chamber having two exhaust efflux outlets to atmosphere, each of said outlets being provided with valve means which are controllable to provide that said exhaust efflux flows to atmosphere via only one of said outlets at a given time, the first of said outlets directing said exhaust efflux to atmosphere via a heat exchanger which is arranged to place said exhaust efflux in heat exchange relationship with air exhausted from the compressor of said gas turbine engine hot gas generator prior to that air being directed to said combustion equipment thereof, the second of said outlets directing said exhaust efflux to atmosphere via a second power turbine which is arranged to drive a further air compressor, the output of which further air compressor is directed through duct means to one of said air inlets of said gas turbine engine compressor, the other of said air inlets being open to atmosphere and having valve means arranged to close said other of said inlets to atmosphere only when air is supplied through said duct means by said further air compressor.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
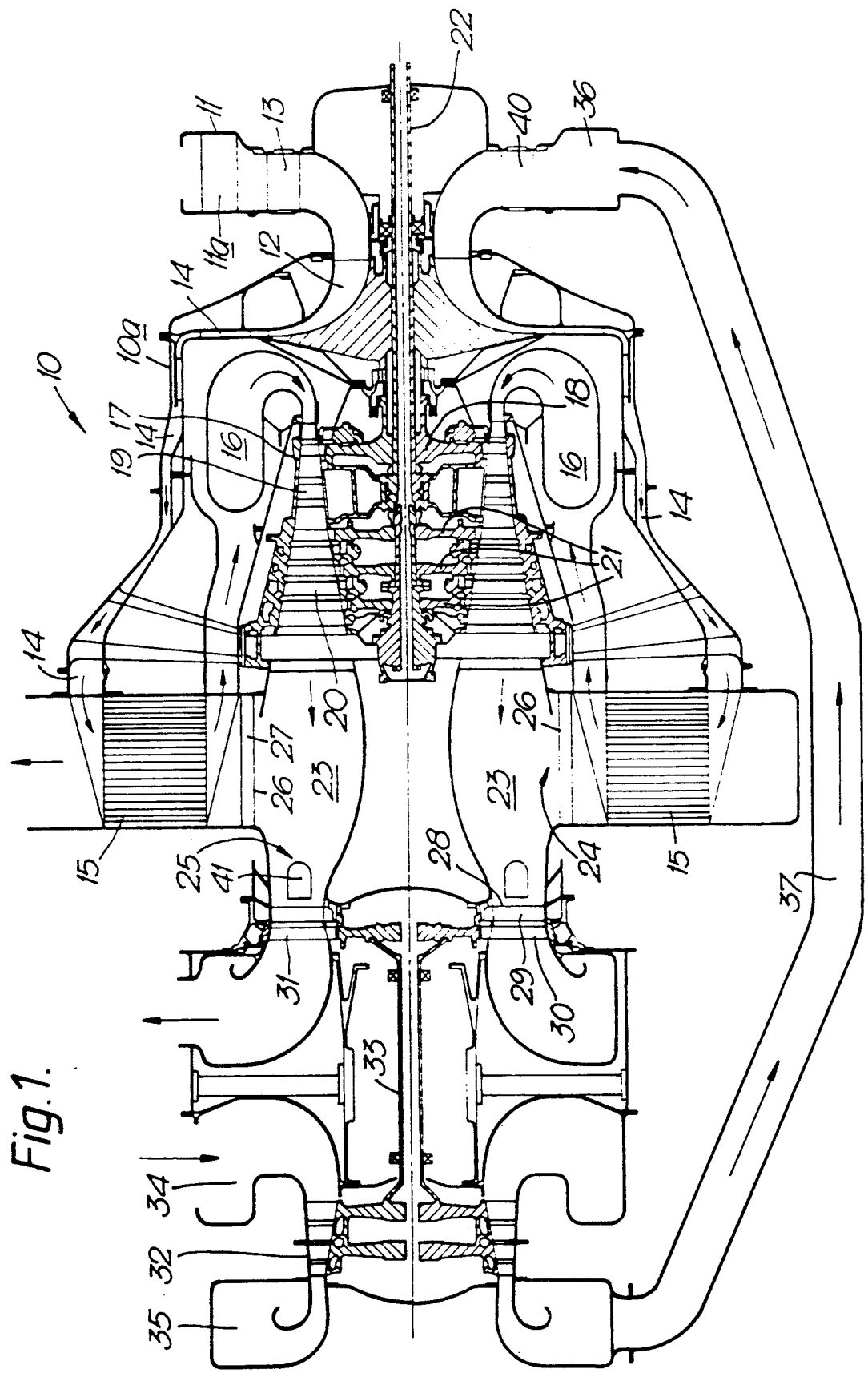
FIG. 1 is a schematic sectioned side view of a gas turbine engine power unit in accordance with the present invention.

With reference to FIG. 1, a gas turbine engine power unit generally indicated at 10 comprises a gas turbine engine hot gas generator 10a which is provided with a first air inlet 11 through which air flows, in operation, to a centrifugal compressor 12. A plurality of vanes 13 are provided in the first air inlet 11 which are pivotable to direct air into the centrifugal compressor 12 at angles which are appropriate to the mode of operation of the gas turbine engine hot gas generator 10a.

After the air has been compressed by the centrifugal compressor 12, it is directed through an annular passage 4 and thence through an annular heat exchanger 15. The heat exchanger 15 serves to increase the temperature of the air by placing it in heat exchange relationship with the hot exhaust efflux of the gas turbine engine 10a and will be described later in greater detail.

From the heat exchanger 15, the heated air is directed to a reverse flow annular combustion chamber 16. There the air is mixed with fuel which is directed into the combustion chamber through an annular array of injectors (not shown) and the mixture combusted. The resultant combustion products then expand through a single stage axial flow first turbine 17, the rotor stage 18 of which is connected to and drives the centrifugal compressor 12.

The combustion products then pass over a series of guide vanes 19 before flowing into and powering a second turbine 20. The second turbine 20 has three rotor stages 21 which are mounted on, and thereby drive, a power output shaft 22. The power output shaft 22 is journalled to rotate coaxially within the compressor 12 and first turbine 17 and extends externally of the power unit 10 to provide power for vehicle propulsion or power generation. The second turbine 20 contra-rotates with respect to the first turbine 17 so that nozzles are not necessary between them, thereby providing a weight saving.

The exhaust efflux from the second turbine 20 flows into an annular chamber 23 having first and second annular outlets 24 and 25. The first outlet 24 is provided with an annular valve 26 which is constituted by an annular array of pivotable vanes 27. The vanes 27 are pivotable abut their longitudinal axes from a first position in which they permit the flow of the exhaust efflux through the first outlet 24, to a second position in which they block the flow of the exhaust efflux through the first outlet 24. Similarly the second outlet 25 is provided with an annular valve 28 constituted by an annular array of pivotable vanes 29 similar to the vanes 27 which are pivotable between positions in which they permit the exhaust efflux to flow through the second outlet 25 and which they block the flow through the second outlet 25.

The actuating mechanisms for the pivotable vanes 27 and 29 (not shown) are controlled (by means not shown) in such a manner that when the first outlet 24 is open, the second outlet 25 is closed and vice versa.

The first outlet 24, when open, is configured to cause the exhaust efflux from the second turbine 20 to exhaust to atmosphere via the heat exchanger 15. The exhaust efflux is of course still hot as it exhausts from the power turbine 20 and so, as stated earlier, serves to increase the temperature of the air exhausted from the centrifugal compressor 12 as the two gases are placed in heat exchange relationship with the heat exchanger 15. Thus thermal energy from the power turbine 20 exhaust efflux is transferred to the air flow which is subsequently directed into the combustion chamber 16. This, as is well known in the gas turbine engine art, enhances the thermal efficiency of the gas turbine engine hot gas generator 10a.

In the above-mentioned mode of operation of the gas turbine engine power unit 10, the unit 10 operates at a high level of efficiency providing a power output via the shaft 22 which is adequate for steady state low power applications. Thus, for instance if the power unit 10 was installed as the prime mover of a marine vessel, such a mode of operation would be suitable for powering the vessel under cruise conditions. However if a large increase in power output from the power unit 10 is required, for instance if the previously mentioned marine vessel is required to rapidly increase its speed, then the power unit is switched to its second mode of operation.

This is achieved by closing the first outlet 24 and opening the second outlet 25. The exhaust efflux from the second turbine 20 then exhausts to atmosphere via a third turbine 30. The third turbine 30 comprises a single rotor 31 and the pivotable vanes 29 constitute variable angle inlet guide vanes which direct the second turbine 20 exhaust efflux on to the rotor 31 at the appropriate angle.

The third turbine 30 drives a further air compressor 32 via an interconnecting shaft 33. The further air compressor 32, which is of the axial flow type, draws in air through an inlet 34 and compresses that air before exhausting it into an annular chamber 35. Means (not shown) prevent the ingestion of the exhaust efflux from the third turbine 30 into the air inlet 34.

The annular chamber 35 is interconnected with a second air inlet 36 for the centrifugal compressor 12 of the gas turbine engine gas generator 10a via an elongate duct 37. It will be seen therefore that in the second mode of operation of the power unit 10, air for the centrifugal compressor 12 is provided solely by the further air compressor 32. In order to enable this, a valve 11a situated in the first air inlet 11 is actuated in order to block off the air flow through the first air inlet 11.

The further air compressor 32 therefore provides a boost in the amount of air supplied to the gas turbine engine gas generator 10a and thereby facilitates a corresponding boost in its output power through the shaft 22. For instance in a typical application in which the output power of the gas generator 10a is 1 MW in the first low power mode of operation, that output power would be boosted to 4MW in the second high power mode of operation.

It may be desirable under certain circumstances to boost the output power of the power unit to even higher levels. This can be achieved by the provision of a second annular combustion chamber 41 at the downstream end of the annular chamber 23. Operation of the combustion chamber 41 results in an increase in the temperature of the gases entering the third turbine 30, thereby in turn increasing its output power.

It will be seen therefore that the power unit 10 is of compact construction with its compressors 12 and 32 located at appropriate ends and is capable of providing a large and rapid boost in its output power when called upon to do so. Furthermore the distance between the second and third turbines 20 and 30 is short, thereby ensuring that little heat is lost in the passage of exhaust efflux gases between them and consequently ensuring good thermal efficiency of the power unit 10. The distance between the compressors 12 and 32 is large. However since it is only cool air which passes through the duct 37 between them, the resultant thermodynamic losses are low.

It will also be seen that the power output shaft 22 could extend from either or both ends of the power unit 10, thereby enhancing its flexibility in particular applications.

It may, under certain circumstances, be acceptable to sacrifice some degree of thermal efficiency in the interests of tailoring the power unit 10 to fit in a particular location. Thus for instance if the unit 10 depicted in FIG. 1 was found to be too long for a given application, the configuration depicted in FIG. 2 could be employed if so desired.

Figure 2:
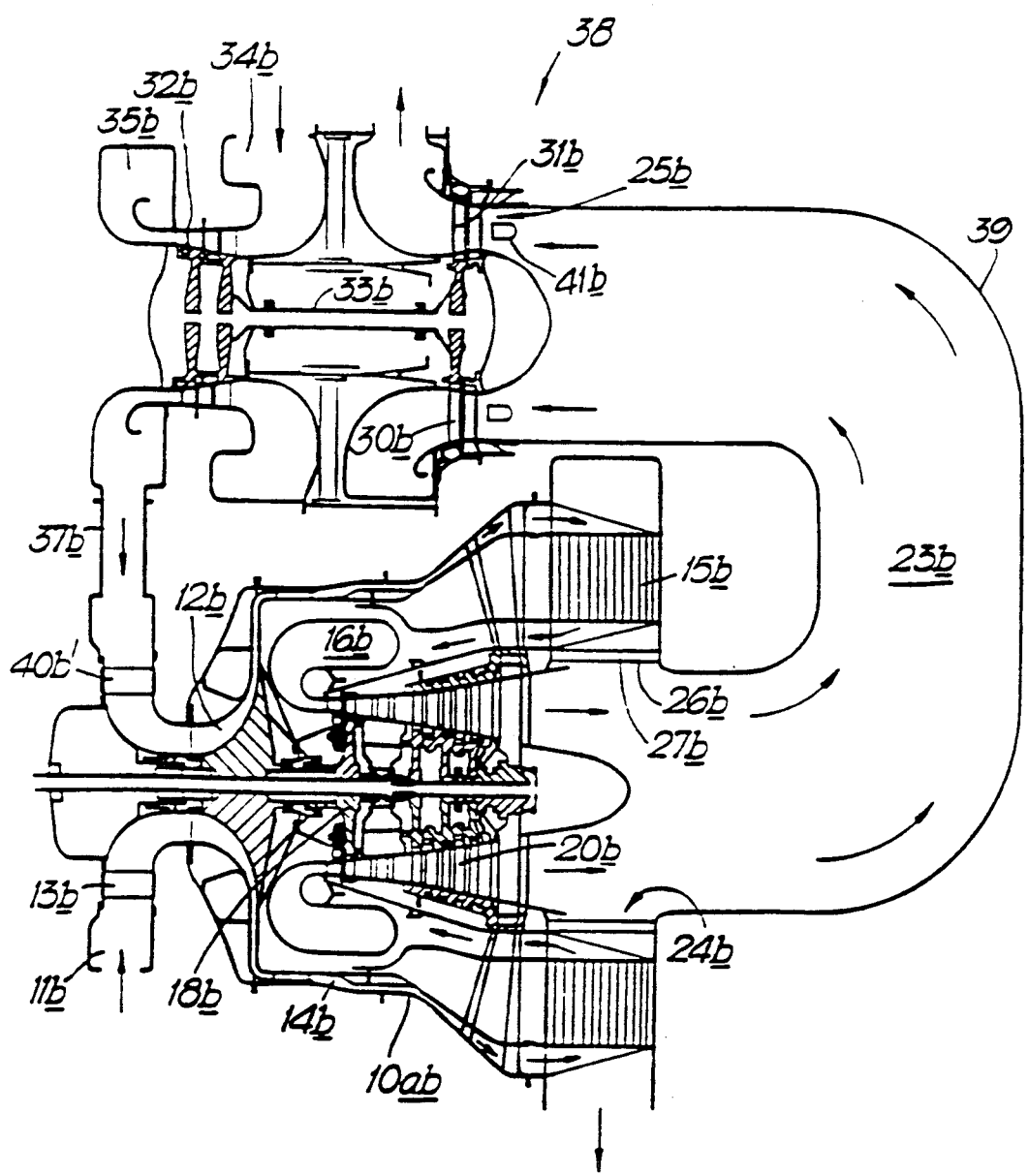
FIG. 2 is a schematic sectioned side view of a further embodiment of a gas turbine engine power unit in accordance with the present invention.

The power unit 38 depicted in FIG. 2 shares many common features with and operates in the same manner as the power unit 10 of FIG. 1. Consequently those features of the power unit of the FIG. 2 embodiment which are common with those of the power unit 10 shown in FIG. 1 will not be described in detail and will be suffixed by the letter "b".

Essentially the gas turbine engine power unit 38 of FIG. 2 differs from the gas turbine engine power unit 10 of FIG. 1 by virtue of the different positioning of their third turbines 30, 30b, and their further air compressors 32, 32b. Thus whereas in the power unit 10, the longitudinal axes of the gas turbine engine hot gas generator 10a, the second turbine 20 and the third turbine 30 are arranged so as to be coaxial, in the power unit 38, the corresponding axes are arranged to be parallel. This results in the power unit 38 being shorter but wider than the power unit 10.

The major consequence of the power unit 38 configuration shown in FIG. 2 is that the chamber 23b in which the exhaust efflux from the first power turbine 20b is exhausted is considerably enlarged so that it is now defined by a generally U-shaped duct 39. Since the chamber 23b is larger than the chamber 23, then there will be some disadvantage from the point of view of thermal efficiency. However this may be acceptable in view of different configuration of the power unit 38.

One further consequence of the power unit 38 configuration shown in FIG. 2 is of course that the duct 37b interconnecting the compressors 12b and 32b is shorter than the duct 37 of the power unit 10.

I claim:

1. A gas turbine engine power unit comprising a gas turbine engine hot gas generator which includes combustion equipment, an air compressor having two air inlets, a first turbine and a second turbine driven in operation by the exhaust efflux of said gas turbine engine hot gas generator and a power output shaft arranged to be driven by said second turbine, a chamber into which the exhaust efflux from said second turbine is directed, said chamber having two exhaust efflux outlets to atmosphere, valve means being provided in each of said outlets which valve means are controllable to provide that said exhaust efflux flows to atmosphere via only one of said outlets at a given time, and a heat exchanger, the first of said outlets directing said exhaust efflux to atmosphere via said heat exchanger which is arranged to place said exhaust efflux in heat exchange relationship with air exhausted from the compressor of said gas turbine engine hot gas generator prior to that air being directed to said combustion equipment thereof, said gas turbine engine power unit additionally being provided with a third power turbine and a further air compressor, the second of said outlets directing said exhaust efflux to atmosphere said third power turbine which is arranged to drive said further air compressor, the output of which further air compressor is directed through duct means to one of said air inlets of said gas turbine engine compressor, valve means being provided in the other of said air inlets, said other of said air inlets being open to atmosphere, said valve means being arranged to close said other of said inlets to atmosphere only when air is supplied through said duct means from said further air compressor.

2. A gas turbine engine power unit as claimed in claim 1 wherein the rotational axes of said gas turbine engine hot gas generator and said third turbine are coaxial.

3. A gas turbine engine power unit as claimed in claim 1 wherein the rotational axes of said gas turbine engine hot gas generator and said second power turbine are coaxial.

4. A gas turbine engine power unit as claimed in claim 3 wherein said air compressor and said further air compressor are situated at opposite ends of said gas turbine engine power unit.

5. A gas turbine engine power unit as claimed in claim 3 wherein said power output shaft extends from at least one of the axial extents of said unit.

6. A gas turbine engine power unit as claimed in claim 3 wherein additional combustion equipment is interposed between said second and third turbines.

7. A gas turbine engine power unit as claimed in claim 1 wherein the rotational axes of said gas turbine engine hot gas generator and said third turbine are parallel.

8. A gas turbine engine power unit as claimed in claim 1 wherein each of said valve means for said exhaust efflux outlets comprises a plurality of pivotally mounted vanes, said vanes being pivotable from a first position in which they permit the flow of said exhaust efflux thereover to a second position in which they block the flow of said exhaust efflux thereover.

9. A gas turbine engine power unit as claimed in claim 8 wherein said vanes are pivotable about their longitudinal axes.

10. A gas turbine engine power unit as claimed in claim 8 wherein the plurality of vanes located in the second of said outlets are so aerodynamically configured as to constitute variable angle inlet guide vanes for said third turbine.

11. A gas turbine engine power unit as claimed in claim 1 wherein said air compressor is of the centrifugal flow type and said further air compressor is of the axial flow type.

12. A gas turbine engine power unit as claimed in claim 1, further comprising an additional combustion equipment provided at a downstream end of said chamber.

13. A gas turbine engine power unit as claimed is claim 1, wherein said second turbine contra-rotation with respect to said first turbine.

* * * * *